United States Patent [19]

Nejime

[11] Patent Number: 5,004,932
[45] Date of Patent: Apr. 2, 1991

[54] UNIT CIRCUIT FOR CONSTRUCTING A NEURAL NETWORK AND A SEMICONDUCTOR INTEGRATED CIRCUIT HAVING THE SAME

[75] Inventor: Yoshito Nejime, Hachioji, Japan
[73] Assignee: Hitachi, Ltd., Tokyo, Japan
[21] Appl. No.: 373,261
[22] Filed: Jun. 27, 1989

[30] Foreign Application Priority Data

Jul. 1, 1988 [JP] Japan ................... 63-162513

[51] Int. Cl.$^5$ .................................. G06G 7/12
[52] U.S. Cl. ...................... 307/201; 307/464; 364/807
[58] Field of Search ............ 307/201, 446, 464, 465, 307/467, 494, 495, 497, 498, 296.7; 364/513, 807; 341/154

[56] References Cited

U.S. PATENT DOCUMENTS

| | | | |
|---|---|---|---|
| 3,430,203 | 2/1969 | Crawford | 307/201 |
| 4,695,979 | 9/1987 | Tuvell et al. | 365/185 |
| 4,731,747 | 3/1988 | Denker | 307/201 X |
| 4,742,492 | 8/1988 | Smayling et al. | 365/185 X |
| 4,782,460 | 11/1988 | Spencer | 307/201 X |
| 4,866,645 | 9/1989 | Lish | 307/201 X |
| 4,873,661 | 10/1989 | Tsinidis | 364/807 |
| 4,874,963 | 10/1989 | Alspector | 307/201 |
| 4,875,183 | 10/1989 | Graf et al. | 364/807 |

FOREIGN PATENT DOCUMENTS 0375792 5/1973 U.S.S.R. .................. 307/201

OTHER PUBLICATIONS

Harman, "Artificial Neuron", *Science*, Apr. 10, 1959, vol. 129, No. 3354, pp. 962-963.
Hollis et al., "Artificial Neurons Using Analog Multipliers".

Primary Examiner—David Hudspeth
Attorney, Agent, or Firm—Antonelli, Terry, Stout & Kraus

[57] ABSTRACT

A semiconductor integrated circuit for constructing a neural network model, comprising a differential amplifier which includes one output terminal and two input terminals, an excitatory synapse circuit which is connected to the noninverting input terminal of said differential amplifier, and an inhibitory synapse circuit which is connected to the inverting input terminal of said differential amplifier, wherein each of said excitatory and inhibitory synapse circuits includes a plurality of current switches, regulated current source ciruits which are equal in number to said current switches and which determine currents to flow through said current switches, and one load resistor which is connected to all of said current switches, input terminals of said each synapse circuit being constructed of terminals which turn "on" and "off" the respective current switches and to which external inputs or outputs of another neural circuit are connected, said each regulated current source circuit being constructed of a circuit whose current value can be increased or decreased by a voltage externally applied separately and as to which a value of the voltage for increasing or decreasing the current value corresponds to a synaptic weight.

19 Claims, 8 Drawing Sheets

UNIT CIRCUIT FOR CONSTRUCTING A NEURAL NETWORK AND A SEMICONDUCTOR INTEGRATED CIRCUIT HAVING THE SAME

BACKGROUND OF THE INVENTION

The present invention relates to semiconductor integrated circuits, and more particularly to a semiconductor integrated circuit which is well suited to form a neural network model in the shape of a monolithic IC.

A neuron consists of a soma, a dendrite and an axon. Of them, the soma generates a pulsing voltage output when its internal potential has risen to exceed a certain threshold value. The pulse voltage is transmitted through the axon until it reaches the distal end of a nerve. The nerve end lies in contact with the dendrite or soma of another neuron. The point of the contact is called a "synapse". The transmission of information between the neurons is effected through the synapse. Such synapses are classified into two sorts; a synapse which has the property of raising the internal potential of the soma of the opposite neuron (hereinbelow, expressed as an "excitatory synapse"), and a synapse which has the property of lowering the internal potential of the soma of the opposite neuron (hereinbelow, expressed as an "inhibitory synapse"). A plurality of synapses are connected to one neuron, and when the pulse reaches one excitatory synapse, the internal potential is caused to rise and then gradually fall in accordance with a certain time constant by the synapse When the pulses reach one synapse continuously, their potentials are successively added with the lapse of time. On that occasion, the arriving pulses have plus or minus weights assigned thereto, depending upon whether they are the excitatory or inhibitory synapses. Therefore, the value of the internal potential becomes the weighted sum of all the inputs. When this value exceeds the threshold value, the neuron generates the pulsing output.

Information processing within the brains of human beings etc. is conducted by a network which is constructed with such a neuron as a unit. Heretofore, in order to explicate the algorithm of the information processing within the brains, researches have been made by modeling the neural network in hardware or software implementation and by performing various aspects of information processing.

Meanwhile, with the progress of semiconductor integrated circuits, researches for realizing the neural network models on semiconductor chips have recently been made vigorously. They are detailed in, for example, "Researches on and Developments of Neurocomputers", NIKKEI ELECTRONICS (dated Jan. 26, 1987, pp. 159-170). The "neurocomputer" mentioned above signifies a computer which is suitable for parallel processing imitative of the operations of the brain of the human being. That is, it achieves the high-speed processing of pattern recognition, combinatorial problems, etc. while utilizing the parallel processing function which is one of the features of the neural network.

FIGS. 7(a) and 7(b) are a symbolic diagram of a neuron, and a graph showing the input/output relationship of the neuron, respectively.

In general, a neural network model is constructed of a plurality of unit circuits, each having many inputs and one output as shown n FIG. 7(a). Hereinbelow, such a unit circuit will be referred to as a "neuron". The respective input terminals of the neuron are given the values of outputs from other neurons. On that occasion, the inputs are multiplied by predetermined weights owing to the functions of the connection parts (hereinbelow, written as "synapses") between the neurons, whereupon the resulting products are afforded to a soma (hereinbelow, written as "cell") 1. FIG. 7(a) shows the symbols of this neuron, and the two sorts of synapses; excitatory synapses 21 having plus weights and inhibitory synapses 22 having minus weights are illustrated.

As stated before, the input/output relationship of the neuron is expressed by the weighted sum of voltages which rise in accordance with a certain time constant. More specifically, as illustrated in FIG. 7(b), the output OUT becomes a function of the summation ($\Sigma_i W_i \cdot P_i$) of the products between all the inputs ($P_1, P_2, ..., P_i, ... $ and $P_n$) and the weights ($W_1, W_2, ..., W_i ...$ and $W_n$) of the synapses lying at the respectively corresponding input ends.

When a plurality of neurons are coupled to one another and the weights of the individual synapses are appropriately selected, the resultant network can perform significant information processing.

An example of the neural network model as expressed using an electrical circuit is Hopfield's model. In this model, resistors are used for expressing the weights, and gate circuits are used for expressing an input/output relationship similar that of FIG. 7(b).

FIG. 8 is a diagram showing the Hopfield model in the prior art.

This diagram is a model diagram illustrated in U. S. Pat. No. 4660166. In the figure, the mark of a black square indicates a resistor which expresses the synaptic weight between two lines intersecting at the corresponding point, and the marks of a gate and an inverter gate indicate excitatory and inhibitory set inputs and outputs, respectively. The input weights and the connection goals of the plus and minus outputs for three neurons are illustrated in FIG. 8.

In general, in a neural network model, it is sometimes the case that, when synaptic weights are changed on and on in accordance with a predetermined algorithm, they are respectively converged to certain values. Such an operation is usually called "learning".

Several methods have been proposed for the algorithm of the learning. In any case, however, the synaptic weights need to be altered.

In the prior art mentioned above, the synaptic weights are expressed by the resistors, and the corrections of the synaptic weights of a circuit once manufactured require to alter the resistances of the resistors. Therefore, all processes must be redone from the layout of an IC, and the alteration of a learned content has been difficult.

SUMMARY OF THE INVENTION

The first object of the present invention is to solve the problem of the prior art as stated above, and to provide a semiconductor integrated circuit which can readily alter synaptic weights as needed and which can realize a neuron circuit suited to a monolithic IC.

Meanwhile, the following is known from researches employing computer simulations: When the learning operation of a neural network model is subjected to the restriction that the summation, or the sum of the squares, of the weights of synapses connected to one neuron is constant, the result of the learning is sometimes enhanced.

In the aforementioned prior-art technique, such an effect has not been considered at all.

The second object of the present invention is to provide the arrangement of a synaptic circuit in which the summation of the weights of synapses connected to one neuron becomes constant without fail.

In an electrical circuit wherein a neural network model is constructed on a semiconductor integrated circuit, of the present invention for accomplishing such objects is characterized by a unit circuit comprising a differential amplifier which includes one output terminal and two input terminals, an excitatory synapse circuit which is connected to the noninverting input terminal of said differential amplifier, and an inhibitory synapse circuit which is connected to the inverting input terminal of said differential amplifier, wherein each of said excitatory and inhibitory synapse circuits includes a plurality of current switches, regulated current source circuits which are equal in number to the number of said current switches and which determine current flow through said current switches, and one load resistor which is connected to all of said current switches, input terminals of said each synapse circuit being constructed of terminals which turn "on" and "off" the respective current switches and to which external inputs or outputs of other unit circuit are connected, said each regulated current source circuit being constructed of a circuit whose current value can be increased or decreased by a voltage externally applied separately and as to which a value of the voltage for increasing or decreasing the current value corresponds to a synaptic weight.

Another characterizing feature resides in that, besides the above construction, a total current which is caused to flow by all the regulated current source circuits within each of the synapse circuits is held constant by another regulated current source circuit which is separately provided According to this construction, one synapse is expressed by one current switch and one current source circuit, the value of the current which is caused to flow into the current switch by each current source circuit corresponds to one synaptic weight, and this current value can be externally controlled. Therefore, the synaptic weights can be easily altered by the voltages or the likes applied from outside.

In addition, the value of the total current of all the regulated current soruces which afford the synaptic weights is held constant by the other regulated current source separately provided, so that when the current values of some regulated current sources are to be increased by the external voltages, the currents of the remaining regulated current sources decrease inevitably. Since the currents of the respective regulated current sources express the synaptic weights, it is imposed as a restriction in the present invention that the summation of the synaptic weights is constant.

Further, in an electrical circuit wherein a neural network model is constructed on a semiconductor integrated circuit; another characterizing feature thereof resides in a unit circuit by comprising a current comparison circuit which includes one output terminal and two input terminals, an excitatory synapse circuit which is connected in series with a noninverting input terminal of said current comparison circuit and which includes at least one current output type D/A converter, and an inhibitory synapse circuit which is connected in series with an inverting input terminal of said current comparison circuit and which includes at least one current output type D/A converter, wherein each of said excitatory and inhibitory synapse circuits includes a plurality of input terminals which have weights, respectively, and to which external inputs or outputs of other unit circuit are connected in any desired combination of said plurality of input terminals.

According to this construction, one synapse has the input terminals numbering n ($n \geq 1$), the respective input terminals respond to an identical input value to generate currents which are successively weighted $2^n$ times, and the sum of the n currents is used as an input from the synapse to a neuron. In each synapse, a synaptic weight is expressed by the combination in which the n input terminals are connected. More specifically, the current output type D/A converter is formed by a circuit in which, on the basis of the aforementioned n inputs of each synapse, the currents weighted by the successive weights of $2^n$ times owned by the synapse are generated, whereupon the n currents are summed up. Thus, the input coupled to each synapse can give the corresponding neuron a current value which is proportional to the weight expressed by a digital value of n bits.

In the case of implementing this circuit in the form of the semiconductor integrated circuit, the structures of the individual synaptic portions are identical at all the synapses, and the weight of each synapse can be digitally and easily corrected merely by changing the connection to the n terminals of the synapse.

BRIEF DESCRIPTION OF THE DRAWINGS

FIG. 7(a) is a symbolic diagram of a neuron, while

DESCRIPTION OF THE PREFERRED EMBODIMENTS

Now, embodiments of the present invention will be described in detail with reference to the drawings.

Figure 1A:
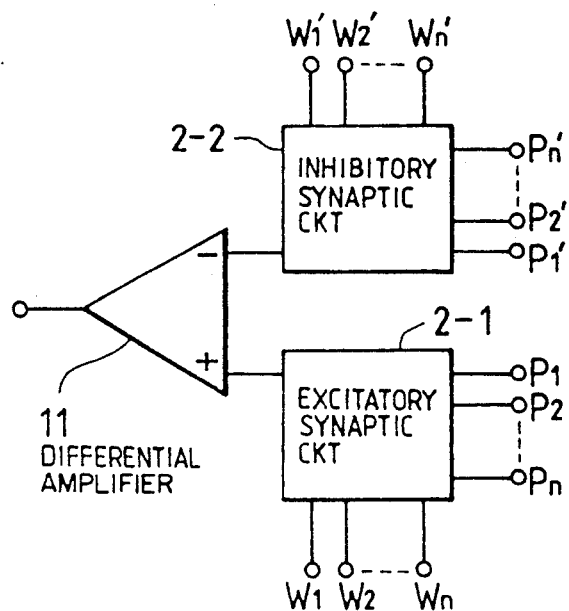
FIG. 1(a) is a diagram showing the outline of a unit circuit constituting a semiconductor integrated circuit of an embodiment of the present invention.

FIG. 1(a) is a block diagram of a unit circuit (neuron) constituting an integrated circuit of an embodiment of the present invention.

Figure 1B:
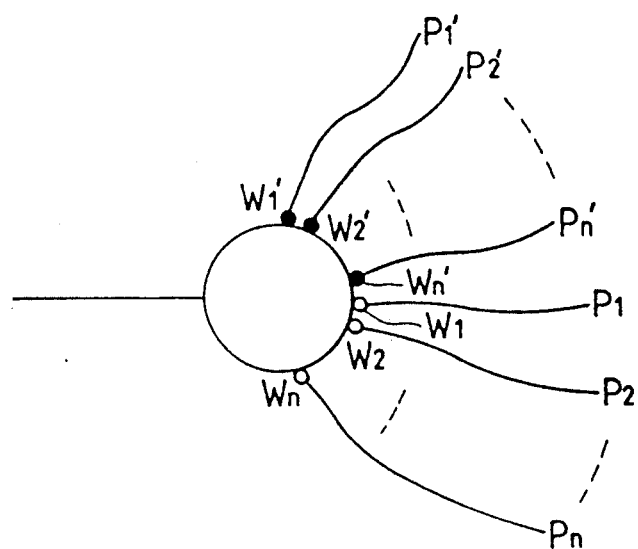
FIG. 1(b) is a symbolic diagram corresponding to FIG. 1(a)

In FIG. 1(a), symbols 2-1 and 2-2 denote synaptic circuits each of which includes n synapses. The circuit 2-1 connected to the + side (noninverting input terminal) of a differential amplifier 11 is an excitatory synapse (synaptic) circuit, while the circuit 2-2 connected to the − side (inverting input terminal) is an inhibitory synapse (synaptic) circuit. Besides, FIG. 1(b) is a diagram in which FIG. 1(a) is symbolically expressed. Parts $P_1$-$P_n$ and $P_1'$-$P_n'$ provided in the individual synaptic circuits 2 are input terminals to which external inputs from outside of the semiconductor integrated circuit or the outputs of other neurons are respectively connected. Here, the input terminals $P_1$-$P_n$ signify ones which are associated with excitatory synapses having weight $W_1$-$W_n$, while the input terminals $P_1'$-$P_n'$ signify ones which are associated with inhibitory synapses having weights $W_1'$-$W_n'$.

Figure 1C:
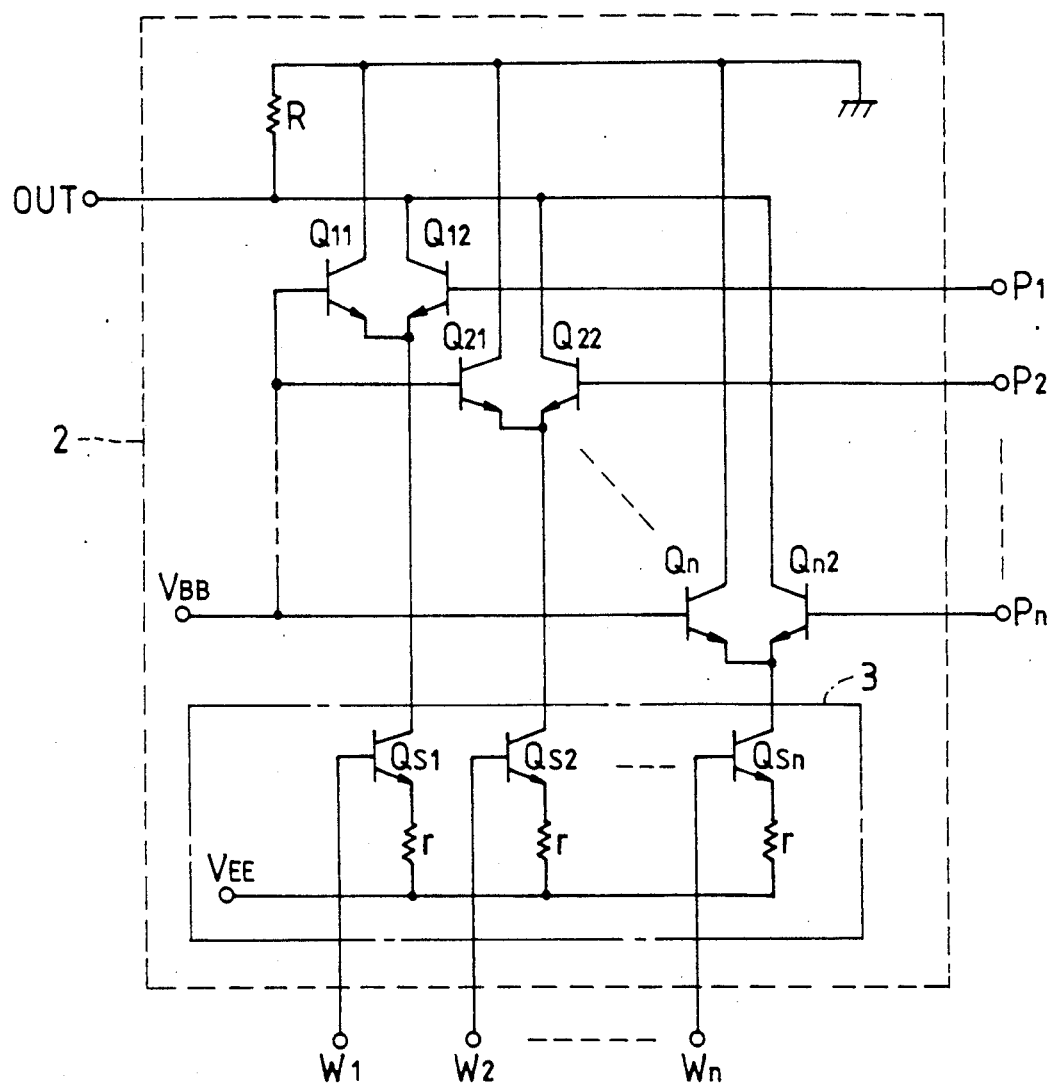
FIG. 1(c) is a diagram showing the details of a synaptic circuit in FIG. 1(a)

FIG. 1(c) is a diagram showing the details of the synaptic circuit 2-1 or 2-2. Referring to the figure, each input is connected to the base of the transistor $Q_{i2}$ of a current switch which is configured of a pair of transistors $Q_{i1}$ and $Q_{i2}$ (i=1−n). The other inputs (the bases of the transistors $Q_{i1}$) of such current switches are all supplied with a fixed voltage VBB. In addition, the emitters of each pair of transistors $Q_{i1}$ and $Q_{i2}$ are both connected to the collector of a transistor $Q_{si}$ underlying the paired transistors. The transistor $Q_{si}$ and a resistor r underlying this transistor operate as a regulated current source. That is, a current $I_i$ of certain fixed value corresponding to the base potential $W_i$ of the transistor $Q_{si}$ flows through this transistor $Q_{si}$.

When the i-th input $P_i$ has become sufficiently greater than the voltage $V_{BB}$, the current $I_i$ corresponding to the potential $W_i$ flows from a resistor R to a voltage terminal $V_{EE}$ via the transistor $Q_{i2}$. To the contrary, when the input $P_i$ has become sufficiently smaller than the voltage $V_{BB}$, the current $I_i$ flows from a GND (ground) point to the terminal $V_{EE}$ via the transistor $Q_{i1}$. Besides, in a case where the input $P_i$ is near the voltage $V_{BB}$, the current whose value is proportional to the magnitude of the input $P_i$ flows through the resistor R.

The resistor R is connected to all the current switches, so that when currents based on the plurality of inputs $P_i$ flow at the same time, the summation current thereof flows through the resistor R. That is, letting $V_o$ denote the output of the synaptic circuit 2, the following holds:

$$V_o = -R \left( \sum_{i=1}^{M} I_i \cdot P_i^* \right) \quad (1)$$

Figure 1D:
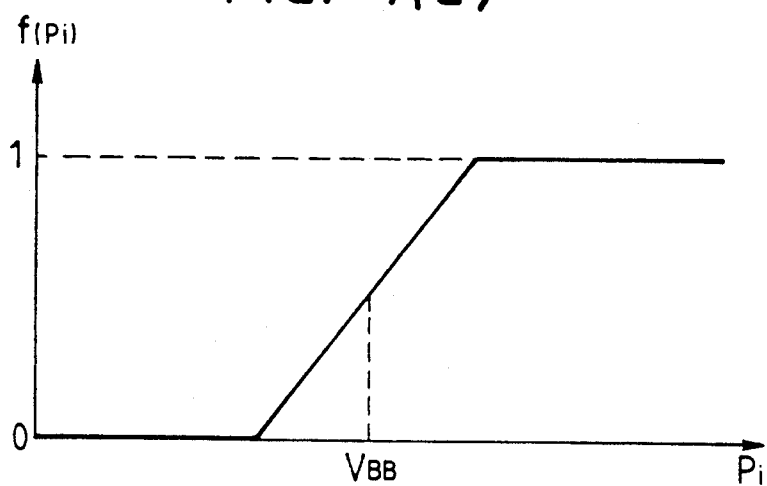
FIG. 1(d) is a graph showing an example of the saturation function $f(P_i)$ of the synaptic circuit with respect to the input signal $P_i$ thereof.
Figure 1E:
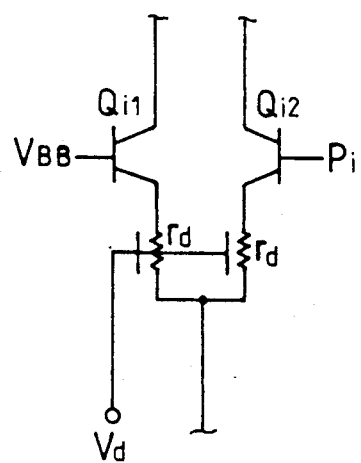
FIG. 1(e) is a diagram showing a circuit for realizing the characteristic in FIG. 1(d)
Figure 7A:
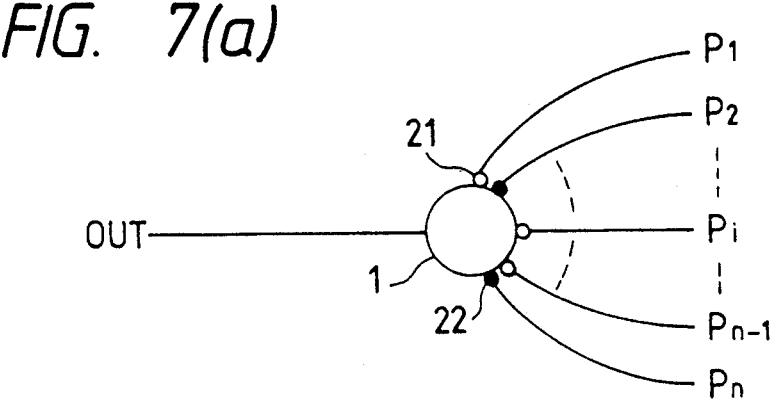
Figure 7B:
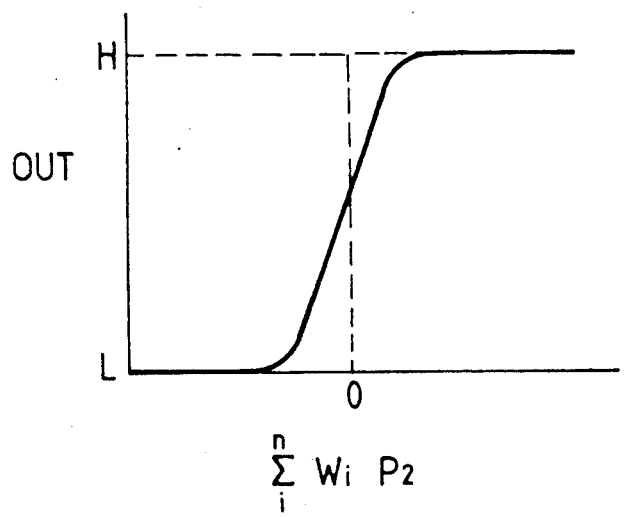
FIG. 7(b) is a graph showing the input/output relationship of the neuron.

In the above formula, $P_i^*$ denotes a variable which becomes "1" when the input voltage to the terminal $P_i$ is sufficiently greater than the voltage $V_{BB}$, which becomes "0" when the former is sufficiently smaller than the latter, and which becomes a value between "1" and "0" in proportion to the input voltage when the former is near the latter. A function $f(P_i)$ which gives the variable $P_i^*$ is as shown in FIG. 1(d) and has a shape similar to that of the function in FIG. 7(b), and the details thereof are determined by the characteristics of each pair of transistors. By way of example as illustrated in FIG. 1(e), resistors $r_d$ are inserted into the emitter coupling parts of each pair of transistors $Q_{i1}$ and $Q_{i2}$ (i=1−n) constituting the current switch, and the resistances thereof are changed. Then, a rectilinear region corresponding to input voltage values near the voltage $V_{BB}$ can be widened or narrowed in the characteristic depicted in FIG. 1(d). When the resistors $r_d$ employed are ones, such as pinch resistors, the resistances of which can be changed by a voltage $V_d$, the saturation function $f(P_i)$ (in FIG. 1(d)) which is exerted on the input can be dynamically varied during the operation of the circuit.

Besides, $I_i$ in Eq. (1) denotes the value of the current which is controlled by the i-th current switch. This value corresponds to the base potential $W_i$ of the transistor $Q_{si}$ included in the i-th regulated current source. Assuming here that the potentials $W_i$ correspond to the synaptic weights, the output $V_o$ in Eq. (1) may be regarded as indicating the summation of the products between the synaptic weights and the inputs.

Eventually, the summations of the products between the synaptic weights and the inputs are respectively provided by the excitatory and inhibitory synapse circuits and are respectively applied as the noninverting and inverting inputs of the differential amplifier 11 so that the output of this differential amplifier 11 may be proportional to the difference of the two inputs. Thus, the summation of the products between the weights and the inputs at all the synaptic nodes is obtained Subsequently, this output is applied to the synaptic circuit of another neuron and is subjected to the function as shown in FIG. 1(d). Therefore, the circuit in FIG. 1(a) operates as one neuron.

When the neuron is expressed by such a construction, the synaptic weights $W_i$ are expressed by the potentials which are externally applied to the bases of the transistors $Q_{si}$ within the synaptic circuits 2, and the values of the weights can be altered at will.

Figure 2:
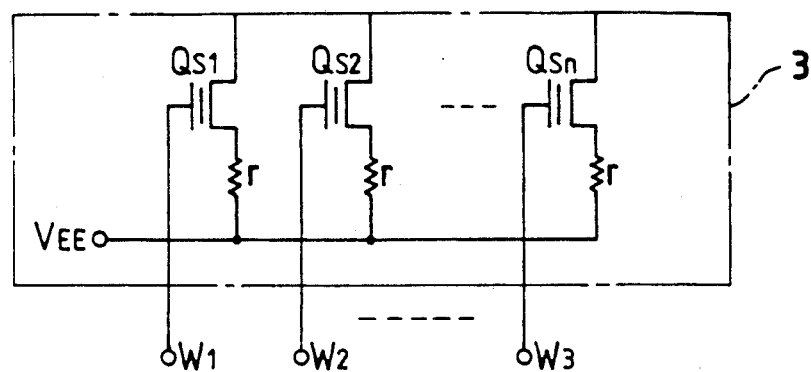
FIG. 2 is a diagram showing the arrangement of a regulated current source portion in the synaptic circuit of the present invention.

The second embodiment of the present invention is such that the regulated current source array 3 in the synaptic circuit 2 of the first embodiment described above is replaced with an arrangement employing MNOS transistors (metal-nitride-oxide-semiconductor transistors, namely, MOS transistors each having a floating gate) as shown in FIG. 2.

A pulse voltage is impressed on the gate of the MNOS transistor for a period of time corresponding to the synaptic weight $W_i$ (i=1−n). A drain current $I_D$ which flows through the MNOS transistor increases substantially in proportion to the duration of the pulse voltage which is impressed on the gate. Moreover, once the current $I_D$ has been set by the impression of the pulse, the value thereof remains constant until a pulse is subsequently impressed again.

Accordingly, whereas any contrivances for keeping the values of the weights $W_i$ constant are necessitated outside the array 3 in the number of the synapses in the first embodiment, they are dispensed with in the second embodiment, to bring forth the effect that the arrangement of the whole circuit can be simplified.

Figure 3:
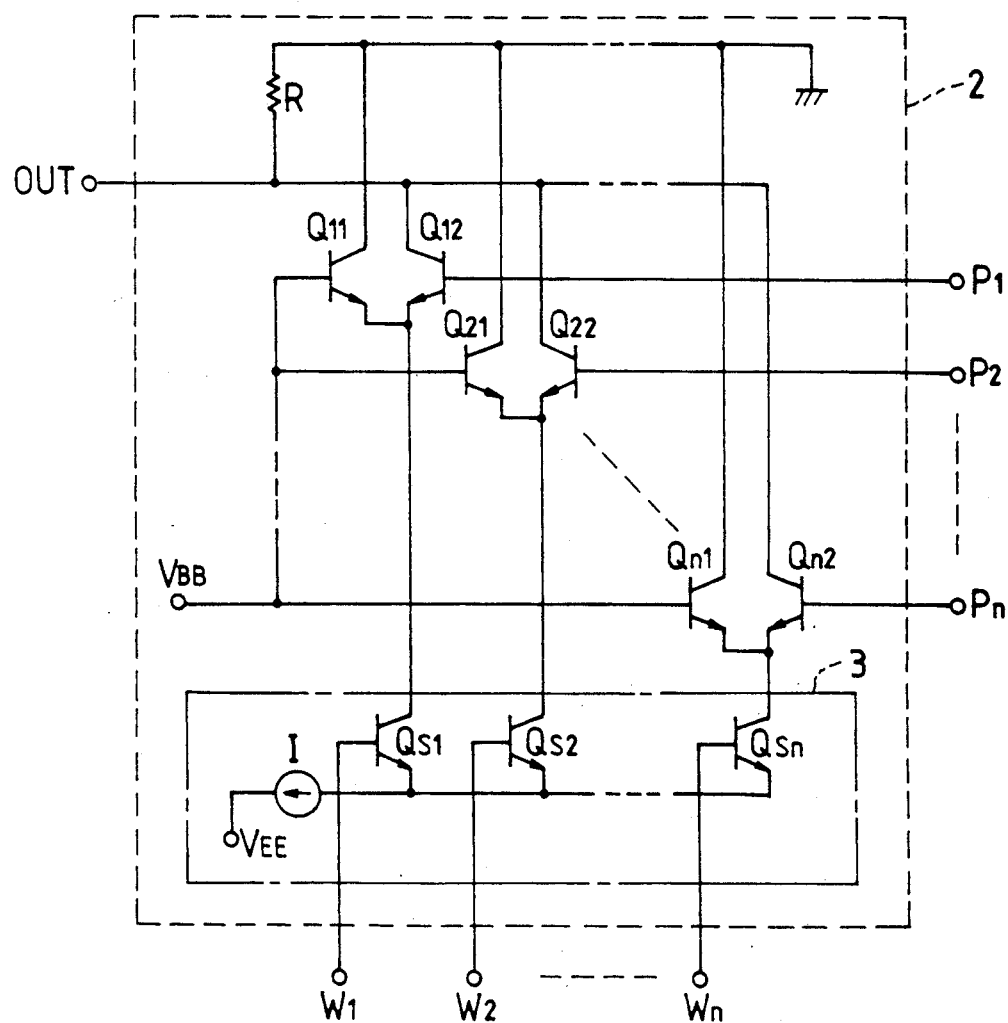
FIG. 3 is a diagram showing another arrangement of the synaptic circuit of the present invention.

FIG. 3 shows the third embodiment of the present invention. The point of difference from the first embodiment is that a total current which the regulated current source array of the synaptic circuit causes to flow is held constant by a regulated current source circuit I which is separately provided. Thus, in the synaptic circuit of the third embodiment, the currents $I_i$ of values corresponding to the weights $W_i$ (i=1−n) flow through the respective current switches, but the summation thereof is always held constant. In other words, the summation of the weights $W_i$ is held constant without fail.

Figure 4:
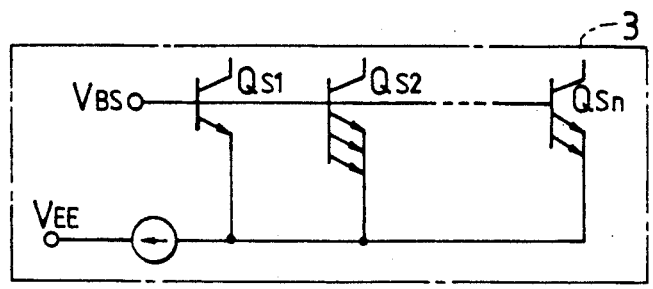
FIG. 4 is a diagram showing the regulated current source portion of the synaptic circuit in FIG. 3.
Figure 4:
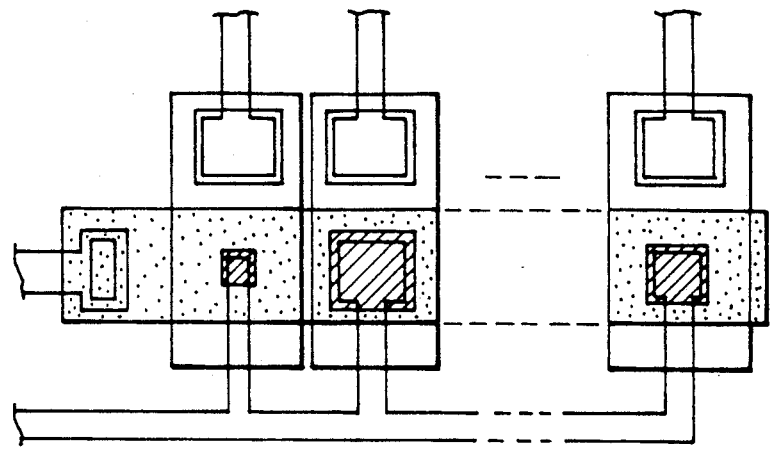
Figure 8:
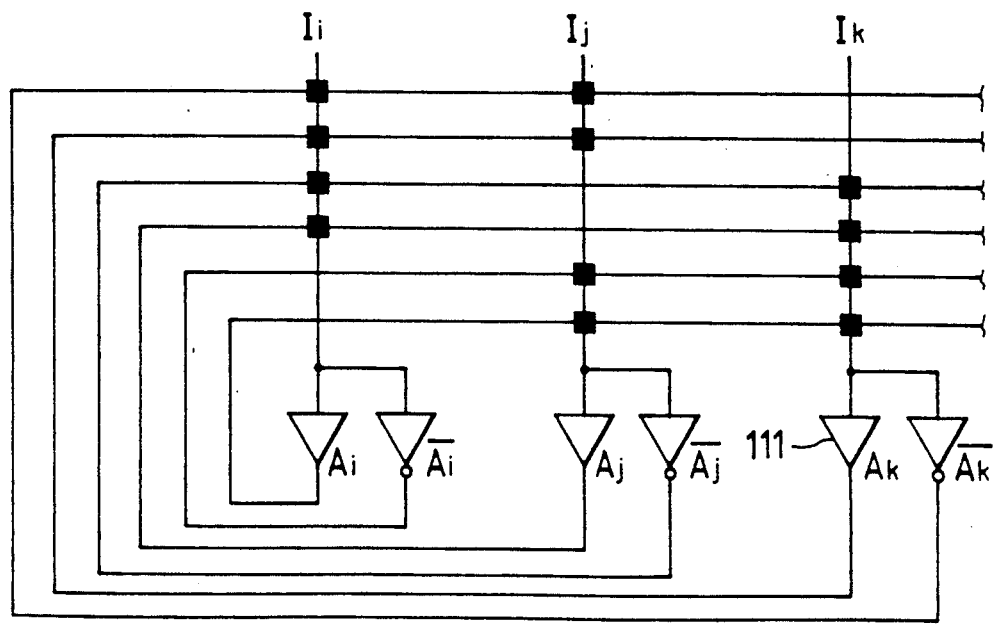
FIG. 8 is a diagram showing Hopfield's model in the prior art.

The fourth embodiment of the present invention consists in that the portion of the regulated current source transistor array 3 in the synaptic circuit 2 shown in FIG. 3 is replaced with an array of transistors as shown in FIG. 4, the base potentials of which are made common and the emitter areas of which are respectively changed in accordance with the values of currents intended to flow. In this embodiment, the values of the regulated currents corresponding to the synaptic weights are respectively determined by the emitter areas of the individual regulated current source transistors. Accordingly, it is impossible to externally and freely change the regulated current values corresponding to the synaptic weights as in the first to third embodiments, and the weights are determined by a pattern in the process of manufacture. This embodiment has many merits in the points of the scale and cost of the device, however both types are appropriate for use depending upon applications.

Incidentally, in the third and fourth embodiments respectively shown in FIGS. 3 and 4, the resistors r as depicted in FIG. 1(c) are not connected to the emitters of the transistors constituting the regulated current source arrays It is to be understood, however, that quite similar operations proceed even when the resistors r are connected.

Figure 5:
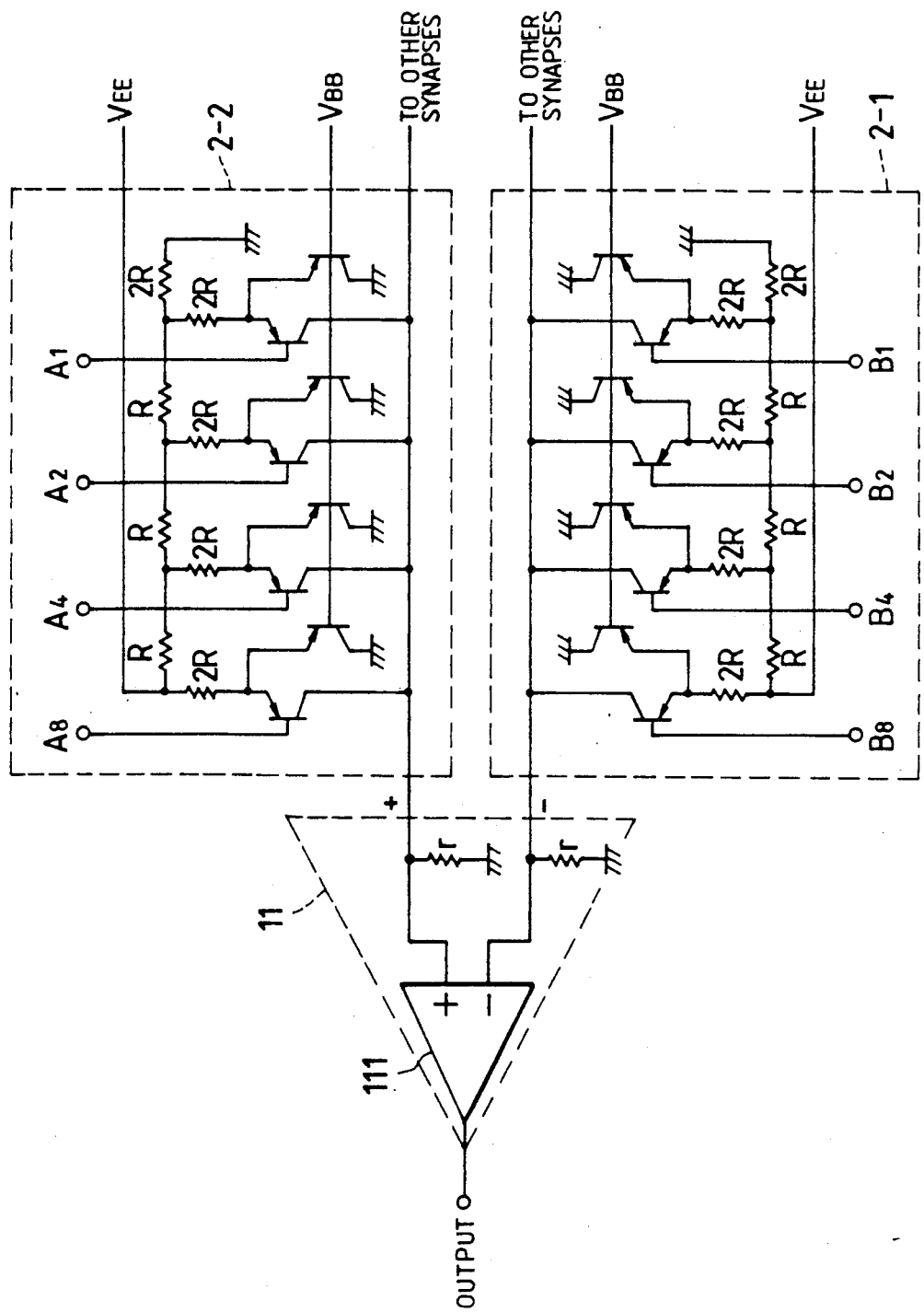
FIG. 5 is a diagram showing another semiconductor integrated circuit according to the present invention.

FIG. 5 is an arrangement diagram of a unit circuit (neuron) constituting a semiconductor integrated circuit of another embodiment of the present invention.

Referring to FIG. 5, numeral 2 (symbol 2-1 or 2-2) indicates one synapse, to which one or more other synapses are connected through a common addition line of + side or − side. The + side addition line executes the addition of the excitatory synapse, while the − side addition line executes the addition of the inhibitory synapse. Parts $A_1$-$A_8$ or $B_1$-$B_8$ provided in the single synapse 2-1 or 2-2 are input terminals to which other neuron outputs are respectively connected. Here, the input terminals $A_1$-$A_8$ are ones of the excitatory synapse, while the terminals $B_1$-$B_8$ are ones of the inhibitory synapse. The synapse 2 configured of current switches, each of which includes resistors R, 2R and P-N-P transistors, is a digital-to-analog (D/A) converter of 4 bits, which supplies a current comparison circuit 11 with 16 values of currents in accordance with the magnitudes of the voltages of the terminals $A_1$-$A_8$ or $B_1$-$B_8$ relative to a power source voltage $V_{BB}$. That is, letting $I_o$ denote the value of the output current of the single synapse, the following holds:

$$I_o = \frac{V_{EE}}{R} \left( \frac{A_8{}^*}{2} + \frac{A_4{}^*}{2^2} + \frac{A_2{}^*}{2^3} + \frac{A_1{}^*}{2^4} \right) \quad (2)$$

In the above formula, $A_1$-$A_8{}^*$ denote variables which become "1" when the input voltages of the terminals $A_1$-$A_8$ from another neuron are respectively greater than the voltage $V_{BB}$, and which become "0" when they are respectively smaller.

The current comparison circuit 11 is constructed of a voltage comparator 111 and resistors r, and it has the nodes of an inverting input (−) and a noninverting input (+). It delivers an output of high voltage ("H") when the current of the noninverting input is more than that of the inverting input, and it delivers an output of low voltage ("L") when the current of the noninverting input is less than that of the inverting input. By the way, the voltage H is set to be sufficiently greater than the power source voltage $V_{BB}$, while the voltage L is set to be sufficiently smaller than the voltage $V_{BB}$.

In connecting the other neuron outputs to the synapse, they are connected to the appropriate combination of the input terminals $A_1$-$A_8$ or $B_1$-$B_8$, whereby desired ones of the 16 weights can be selected.

Figure 6A:
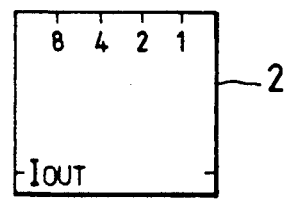
FIG. 6(a) is a model diagram of a synaptic circuit shown in FIG. 5.
Figure 6B:
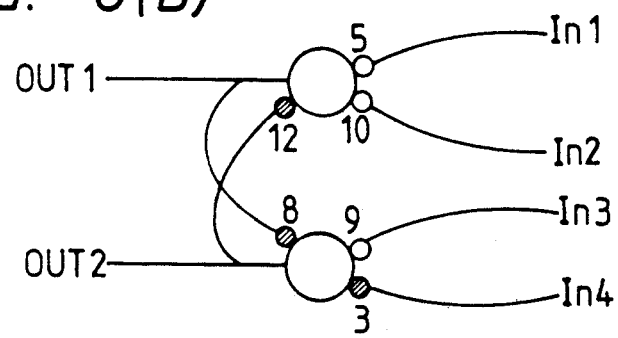
FIG. 6(b) is a symbolic diagram of a neural network which employs the unit circuit in FIG. 5.
Figure 6C:
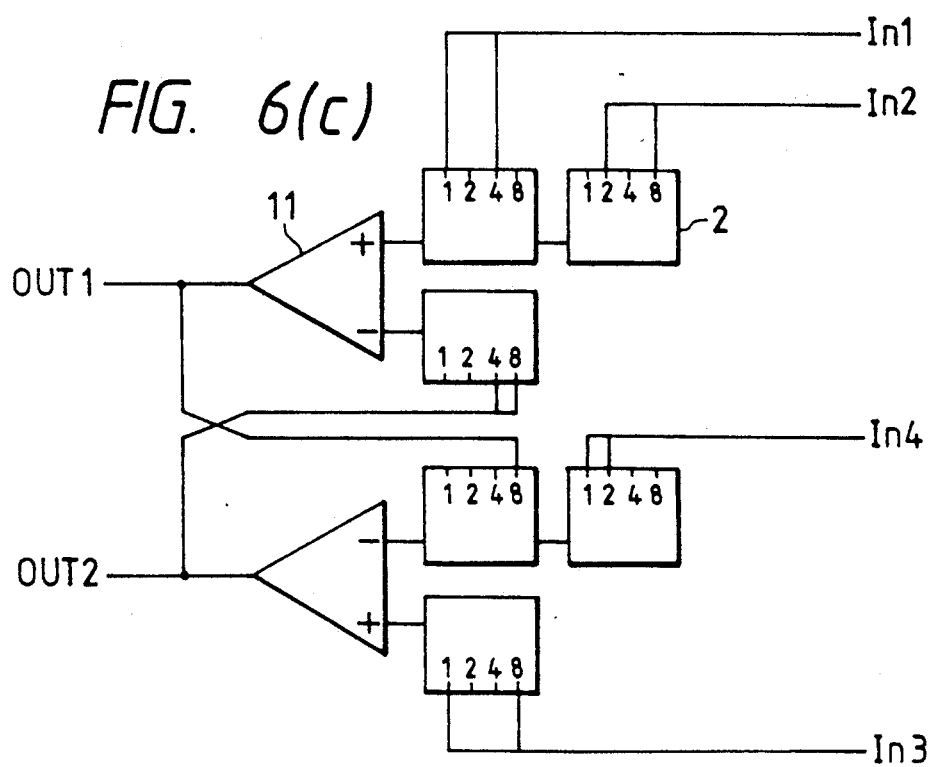
FIG. 6(c) is a symbolic connection diagram of the neural network in FIG. 6(b)

FIGS. 6(a) - 6(c) illustrate a model for the synapses and neuron shown in FIG. 5.

FIG. 6(a) is a model diagram showing the synaptic circuit 2 in FIG. 5 in a simplified form. Numerals 8, 4, 2 and 1 denote the input terminals $A_8$, $A_4$, $A_2$ and $A_1$, respectively, and symbol $I_{OUT}$ denotes the current output of the synapse.

Besides, FIG. 6(b) is a symbolic diagram showing an example of a neural network which adopts the neuron circuit in FIG. 5, and two neurons are used here. Numerical values affixed to the synapses in the figure signify the absolute values of the weights of the corresponding synapses.

The first neuron receives an exitatory input of weight 5 from another neuron ($I_{n1}$) and one of weight 10 from still another neuron ($I_{n2}$), and it further receives an inhibitory input of weight −12 from the second neuron. On the other hand, the second neuron receives an excitatory input of weight 9 from another neuron ($I_{n3}$), and it receives an inhibitory input of weight −3 from another neuron ($I_{n4}$) and one of weight −8 from the first neuron. Respective outputs OUT1 and OUT2 from the first and second neurons are sent to other neurons.

FIG. 6(c) is a connection diagram in which the neural network in the symbolic diagram of FIG. 6(b) is expressed with the symbol in FIG. 6(a).

First, a common current node to which the first and second synapses are connected in series is coupled to the (+) terminal of the first neuron, and a current node to which the third synapse is connected is coupled to the (−) terminal thereof The outputs from the other neuron $I_{nl}$ are connected to the terminals $A_1$ and $A_4$ of the first synapse, whereby a (+) voltage is input in accordance with a weight of $1+4=5$, and the outputs from the other neuron $I_{n2}$ are connected to the terminals $A_2$ and $A_8$, whereby a (+) voltage is input in accordance with a weight of $2+8=10$. Besides, the outputs from the second neuron are connected to the terminals $A_4$ and $A_8$ of the third synapse, whereby a (−) voltage is input in accordance with a weight of $4+8=12$.

On the other hand, a common current node to which the first and second synapses are connected in series is coupled to the (−) terminal of the second neuron, and a current node to which the third synapse is connected is coupled to the (+) terminal thereof. The output from the first neuron is connected to the terminal $A_8$ of the first synapse whereby a (−) voltage is input in accordance with the weight of 8, and the outputs from the other neuron $I_{n4}$ are connected to the terminals $A_1$ and $A_2$ of the second synapse, whereby a (−) voltage is input in accordance with a weight of $1+2=3$. Besides, the outputs from the other neuron $I_{n3}$ are connected to the terminals $A_1$ and $A_8$ of the third synapse, whereby a (+) voltage is input in accordance with a weight of $1+8=9$.

By the way, each of the synaptic circuits in FIG. 5 is constructed of the current switch circuit which employs the resistors R, 2R and the P-N-P transistors. Of course, however, any other circuit can be used quite similarly as long as it is the D/A converter of the current output type.

Further, although the number of the input terminals of the synapse is four, that is, the weight is expressed by 4 bits in FIG. 5 and FIGS. 6(a)–6(c), the number of bits can be determined at will.

In this manner, with this embodiment, when a neural network model is to be constructed on a semiconductor integrated circuit, the weights of synapses used in the model can be corrected in a procedure similar to that of a gate array.

As described above, according to the present invention, current values corresponding to synaptic weights can be readily altered by voltages applied externally, and it is therefore permitted to construct a neuron circuit which is easy of altering a learned content and which is suited to a monolithic IC.

Moreover, the summation of the current values corresponding to the synaptic weights is held constant by another regulated current source, and it is therefore permitted to construct a neuron circuit in which the summation of the synaptic weights is held constant without fail.

What is claimed is:

1. A unit circuit for constructing a neural network comprising:
    a differential amplifier which includes an output terminal, an inverting input terminal and a noninverting input terminal;
    an excitory synapse circuit which is connected to the noninverting input terminal of said differential amplifier; and
    an inhibitory synapse circuit which is connected to the inverting input terminal of said differential amplifier,
    wherein each of said excitory and inhibitory synapse circuits includes a plurality of current switches, a regulated current source array which is configured of regulated current source circuits being equal in number to the number of said current switches, said regulated current source circuits determining values of currents that flow through said current switches, and includes one load resistor which is connected to all of said current switches, and
    wherein input terminals of each synapse circuit are responsive to inputs which turn "on" and "off" the respective current switches and to which input terminals external inputs or outputs of other unit circuits are applied, said regulated current source circuits having current values which can be respectively altered by voltages externally applied independently of one another.

2. A unit circuit according to claim 1, wherein each one of said regulated current source circuits includes a MOS transistor with a control gate and a floating gate and a resistor, whereby in response to a pulse voltage being impressed on the control gate of said MOS transistor control of the value of current which flows through the corresponding regulated current source circuit is effected.

3. A unit circuit according to claim 1, wherein in said regulated current source array, a summation current corresponding to the sum of currents flowing through all of said regulated current source circuits included therein is held constant by a further single regulated current source commonly coupled therewith.

4. A unit circuit for constructing a neural network comprising:
    a differential amplifier which includes an output terminal, an inverting input terminal and a noninverting input terminal;
    an excitory synapse circuit which is connected to the noninverting input terminal of said differential amplifier; and
    an inhibitory synapse circuit which is connected to the inverting input terminal of said differential amplifier,
    wherein each of said excitory and inhibitory synapse circuits includes a plurality of current switches, a regulated current source array which is configured of regulated current source circuits being equal in number to the number of said current switches, said regulated current source circuits determining values of currents that flow through said current switches, and includes one load resistor which is connected to all of said current switches,
    wherein input terminals of each synapse circuit are responsive to inputs which turn "on" and "off" the respective current switches and to which input terminals external inputs or outputs of other unit circuits are applied, and
    wherein said regulated current source array includes a plurality of transistors whose emitter areas differ in accordance with values of currents to be respectively flowing therethrough.

5. A unit circuit according to claim 1, wherein each one of said current switches includes one pair of transistors and resistors which are connected in series with emitters of the respective transistors, and wherein said resistors includes resistors whose resistances can be controllably altered externally.

6. A unit circuit according to claim 5, wherein in said current switches, said resistors include pinch resistors having externally applied thereto a controllable voltage potential.

7. A unit circuit for constructing a neural circuit comprising:
    a current comparison circuit which includes an output terminal, an inverting input terminal and a noninverting input terminal;
    an excitatory synapse circuit which is connected in series with the noninverting input terminal of said current comparison circuit an which includes at least one current output type digital-to-analog (D/A) converter; and
    an inhibitory synapse circuit which is connected in series with the inverting input terminal of said current comparison circuit and which includes at least one current output type D/A converter,
    wherein each of said excitatory and inhibitory synapse circuits includes a plurality of input terminals which have weights, respectively, and to which input terminals external outputs of other unit circuits are applied in any desired combination of said plurality of input terminals.

8. A unit circuit according to claim 7, wherein each synapse circuit includes a D/A converter comprised of a plurality of interconnected digital-to-analog converting circuit sets each of which is comprised of first and second resistors of relative resistance R and 2R, respectively, and a current switch circuit formed of bipolar transistors.

9. A unit circuit according to claim 8, wherein each converting circuit set is correspondingly associated with a respective one of a plurality of binary bit inputs applied at a corresponding bipolar transistor base input terminal of a first bipolar transistor of a differentially-coupled pair of bipolar transistors, the other one of said pair of bipolar transistors having base input terminals commonly-biased with a reference potential, and wherein said second resistor has one end coupled to a common emitter connection of a pair of corresponding differentially-coupled transistors, another other end of said second resistor being connected to a first end of a corresponding first resistor having another end coupled to a common connection of the first and second resistors of another converting circuit set.

10. A unit circuit according to claim 9, wherein said bipolar transistors are PNP transistors.

11. A unit circuit for constructing a neural network comprising:
- a differential amplifier which includes an output terminal, an inverting input terminal and a noninverting input terminal;
- an excitory synapse circuit which is coupled to the noninverting input terminal of said differential amplifier; and
- an inhibitory synapse circuit which is coupled to the inverting input terminal of said differential amplifier,
- wherein each of said excitatory and inhibitory synapse circuits includes a plurality of current switches, a regulated current source array which is configured of regulated current source circuits being equal in number to the number of said current switches, said regulated current source circuits determining values of currents that flow through said current switches, and includes one load resistor which is connected to all of said current switches,
- wherein input terminals of each synapse circuit are responsive to inputs which turn "on" and "off" the respective current switches and to which input terminals external inputs or outputs of other unit circuits are applied, and
- wherein said plurality of current switches have respective saturation functions which are exerted on signals applied on respective input terminals of each of said excitatory and inhibitory synapse circuits.

12. A semiconductor integrated circuit having unit circuits constructing a neural network, each one of said unit circuits comprising:
- a differential amplifier which includes an output terminal, an inverting input terminal and a noninverting input terminal;
- an excitory synapse circuit which is connected to the noninverting input terminal of said differential amplifier; and
- an inhibitory synapse circuit which is connected to the inverting input terminal of said differential amplifier,
- wherein each of said excitatory and inhibitory synapse circuits includes a plurality of current switches, a regulated current source array which is configured of regulated current source circuits being equal in number to the number of said current switches, said regulated current source circuits determining values of currents that flow through said current switches, and includes one load resistor which is connected to all of said current switches, and
- wherein input terminals of each synapse circuit are responsive to inputs which turn "on" and "off" the respective current switches and to which input terminals external inputs or outputs of other unit circuits are applied, said regulated current source circuits having current values which can be respectively altered by voltages externally applied independently of one another.

13. A semiconductor integrated circuit according to claim 12, wherein each one of said regulated current source circuits includes a non-volatile MOS transistor, having a control terminal, and a current conducting channel in series connection with a respective resistor whereby in response to a pulse voltage applied on said control terminal control of the value of current flow through the corresponding regulated current source circuit is effected.

14. A semiconductor integrated circuit according to claim 12, wherein in said regulated current source array, a summation current corresponding to the sum of currents flowing through all of said regulated current source circuits included therein is held constant by a further single regulated current source commonly coupled therewith.

15. A semiconductor integrated circuit having unit circuits constructing a neural network, each one of said unit circuits comprising:
- a differential amplifier which includes an output terminal, an inverting input terminal and a noninverting input terminal;
- an excitory synapse circuit which is connected to the noninverting input terminal of said differential amplifier; and
- an inhibitory synapse circuit which is connected to the inverting input terminal of said differential amplifier,
- wherein each of said excitatory and inhibitory synapse circuits includes a plurality of current switches, a regulated current source array which is configured of regulated current source circuits being equal in number to the number of said current switches, said regulated current source circuits determining values of currents that flow through said current switches, and includes one load resistor which is connected to all of said current switches, and
- wherein input terminals of each synapse circuit are responsive to inputs which turn "on" and "off" the respective current switches and to which input terminals external inputs or outputs of other unit circuits are applied, and
- wherein said regulated current source array includes a plurality of transistors whose emitter areas differ in accordance with values of currents to be respectively flowing therethrough.

16. A semiconductor integrated circuit having unit circuits constructing a neural network, each one of said unit circuits comprising:
- a current comparison circuit which includes an output terminal, an inverting input terminal and a noninverting input terminal;
- an excitatory synapse circuit which is connected in series with the noninverting input terminal of said current comparison circuit an which includes at least one current output type digital-to-analog (D/A) converter; and
- an inhibitory synapse circuit which is connected in series with the inverting input terminal of said current comparison circuit and which includes at least one current output type D/A converter, wherein each of said excitatory and inhibitory synapse circuits includes a plurality of input terminals which have weights, respectively, and to which input terminals external outputs of other unit circuits are applied in any desired combination of said plurality of input terminals.

17. A semiconductor integrated circuit according to claim 16, wherein each synapse circuit includes a D/A converter comprised of a plurality of interconnected digital-to-analog converting circuit sets each of which is comprised of first and second resistors of relative resistances R and 2R, respectively, and a current switch circuit formed of bipolar transistors.

18. A semiconductor integrated circuit according to claim 17, wherein each converting circuit set is correspondingly associated with a respective one of a plurality of binary bit inputs applied at a corresponding bipolar transistor base input terminal of a first bipolar transistor of a differentially coupled pair of bipolar transistors, the other one of said pair of bipolar transistors having base input terminals commonly-biased with a reference potential, and wherein said second resistor has one end coupled to a common emitter connection of a pair of corresponding differentially-coupled transistors, another end of said second resistor being connected to a first end of a corresponding first resistor having another end coupled to a common connection of the first and second resistor of another converting circuit set.

19. A semiconductor integrated circuit according to claim 18, wherein said bipolar transistors are PNP transistors.

* * * * *